United States Patent
Miyoshi et al.

(10) Patent No.: US 11,175,846 B2
(45) Date of Patent: Nov. 16, 2021

(54) DATA CO-LOCATION IN A HIERARCHICAL STORAGE MANAGEMENT (HSM) SYSTEM

(71) Applicant: INTERNATIONAL BUSINESS MACHINES CORPORATION, Armonk, NY (US)

(72) Inventors: Hiroyuki Miyoshi, Kanagawa-ken (JP); Hiroshi Araki, Kanagawa (JP); Takeshi Ishimoto, Kanagawa-ken (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/381,971

(22) Filed: Apr. 11, 2019

(65) Prior Publication Data
US 2020/0326872 A1 Oct. 15, 2020

(51) Int. Cl.
*G06F 3/06* (2006.01)

(52) U.S. Cl.
CPC ......... *G06F 3/0647* (2013.01); *G06F 3/0604* (2013.01); *G06F 3/0685* (2013.01)

(58) Field of Classification Search
CPC .... G06F 3/0647; G06F 3/0685; G06F 3/0643; G06F 3/0611; G06F 16/119; G06F 16/185; G06F 2212/213; G06F 16/27; G06F 11/1469; G06F 3/0604; G06F 3/061; G06F 3/0649
USPC ........................................................ 711/117
See application file for complete search history.

(56) References Cited

U.S. PATENT DOCUMENTS

| | | | |
|---|---|---|---|
| 5,991,753 A | 11/1999 | Wilde | |
| 6,330,572 B1 | 12/2001 | Sitka | |
| 7,634,516 B2 | 12/2009 | Cannon et al. | |
| 8,209,297 B2 | 6/2012 | Yanai et al. | |
| 8,756,199 B2 | 6/2014 | Sutoh et al. | |
| 9,760,305 B2 | 9/2017 | Hasegawa et al. | |
| 2003/0046270 A1 | 3/2003 | Leung et al. | |
| 2006/0101084 A1* | 5/2006 | Kishi | G06F 3/0686 |
| 2008/0102590 A1 | 5/2008 | Gehring et al. | |
| 2009/0021403 A1 | 1/2009 | Chan et al. | |
| 2011/0010495 A1* | 1/2011 | Haustein | G06F 3/0686 711/111 |
| 2011/0078112 A1 | 3/2011 | Takata et al. | |
| 2011/0320679 A1 | 12/2011 | Ashton et al. | |
| 2012/0166389 A1* | 6/2012 | Shiozawa | G06F 16/128 707/610 |
| 2015/0095294 A1 | 4/2015 | Tsuda | |

(Continued)

FOREIGN PATENT DOCUMENTS

| | | |
|---|---|---|
| JP | 2006276926 A | 10/2006 |
| JP | 2008102590 A | 5/2008 |

OTHER PUBLICATIONS

List of IBM Patents or Patent Applications Treated as Related Jun. 15, 2020 (2 Pages).

*Primary Examiner* — Hashem Farrokh

(74) *Attorney, Agent, or Firm* — Griffiths & Seaton PLLC

(57) ABSTRACT

A system and method for data co-location in hierarchical storage management (HSM) system are presented. Related data units may be grouped to be collectively accessed from a plurality of data units stored on a first sequential media. The related data units may be migrated from the first sequential media in the HSM system to a second sequential media in the HSM system to sequential and continuous access to the related data units on the second sequential media.

20 Claims, 6 Drawing Sheets

(56) References Cited

U.S. PATENT DOCUMENTS

| | | |
|---|---|---|
| 2016/0162498 A1 | 6/2016 | Hasegawa et al. |
| 2017/0083437 A1 | 3/2017 | Hasegawa |
| 2017/0161155 A1 | 6/2017 | Haustein et al. |
| 2018/0018115 A1* | 1/2018 | Ikegame ............... G06F 3/0619 |
| 2018/0157413 A1 | 6/2018 | Kawamura et al. |
| 2019/0310789 A1 | 10/2019 | Miyoshi et al. |
| 2019/0339896 A1* | 11/2019 | McCloskey ........... G06F 3/0647 |

* cited by examiner

500

| PHYSICAL TAPE IDENTIFIER | FILE GROUP |
|---|---|
| TAPE 1 | 1, 2, 3 |
| TAPE 2 | 4, 5 |

| PHYSICAL TAPE IDENTIFIER | FILE GROUP |
|---|---|
| TAPE 1 | G1_file1, G2_file1, G3_file1, G1_file2, invalid file |
| TAPE 2 | G4_file3, G5_file1, invalid file, G4_file4 |

| PHYSICAL TAPE IDENTIFIER | FILE GROUP |
|---|---|
| TAPE 1 | G1_file1, G1_file2, G2_file1, G3_file1, G7_file1, G7_file2 |
| TAPE 2 | G4_file3, G4_file4, G4_file1, G4_file2, G5_file1 |

FIG. 7

DATA CO-LOCATION IN A HIERARCHICAL STORAGE MANAGEMENT (HSM) SYSTEM

BACKGROUND OF THE INVENTION

Field of the Invention

The present invention relates in general to computing systems, and more particularly to, various embodiments for data co-location in hierarchical storage management (HSM) by a processor.

Description of the Related Art

In today's society, consumers, business persons, educators, and others use various computing network systems with increasing frequency in a variety of settings. The advent of computers and networking technologies have made possible the increase in the quality of life while enhancing day-to-day activities. For example, processing devices, with the advent and further miniaturization of integrated circuits, have made it possible to be integrated into a wide variety of devices for personal, business, health, home, education, scientific, or governmental related areas of interest. As great strides and advances in technologies come to fruition, the greater the need to make progress in these systems advantageous for efficiency, communication, and improvement in society.

SUMMARY OF THE INVENTION

Various embodiments for implementing data co-location in hierarchical storage management (HSM) using one or more processors are provided. In one embodiment, by way of example only, a method for performing data co-location in hierarchical storage management (HSM), again by a processor, is provided. Related data units may be grouped to be collectively accessed from a plurality of data units stored on a first sequential media. The related data units may be migrated from the first sequential media in the HSM system to a second sequential media in the HSM system to sequential and continuous access to the related data units on the second sequential media.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 5 is a block diagram depicting a mapping table in a hierarchical storage management (HSM) system for data co-location according to various aspects of the present invention;

FIG. 6 is a block diagram depicting an additional mapping table in a hierarchical storage management (HSM) system for data co-location according to various aspects of the present invention;

FIG. 7 is a block diagram depicting an additional mapping table in a hierarchical storage management (HSM) system for data co-location according to various aspects of the present invention.

DETAILED DESCRIPTION OF THE DRAWINGS

Figure 1:
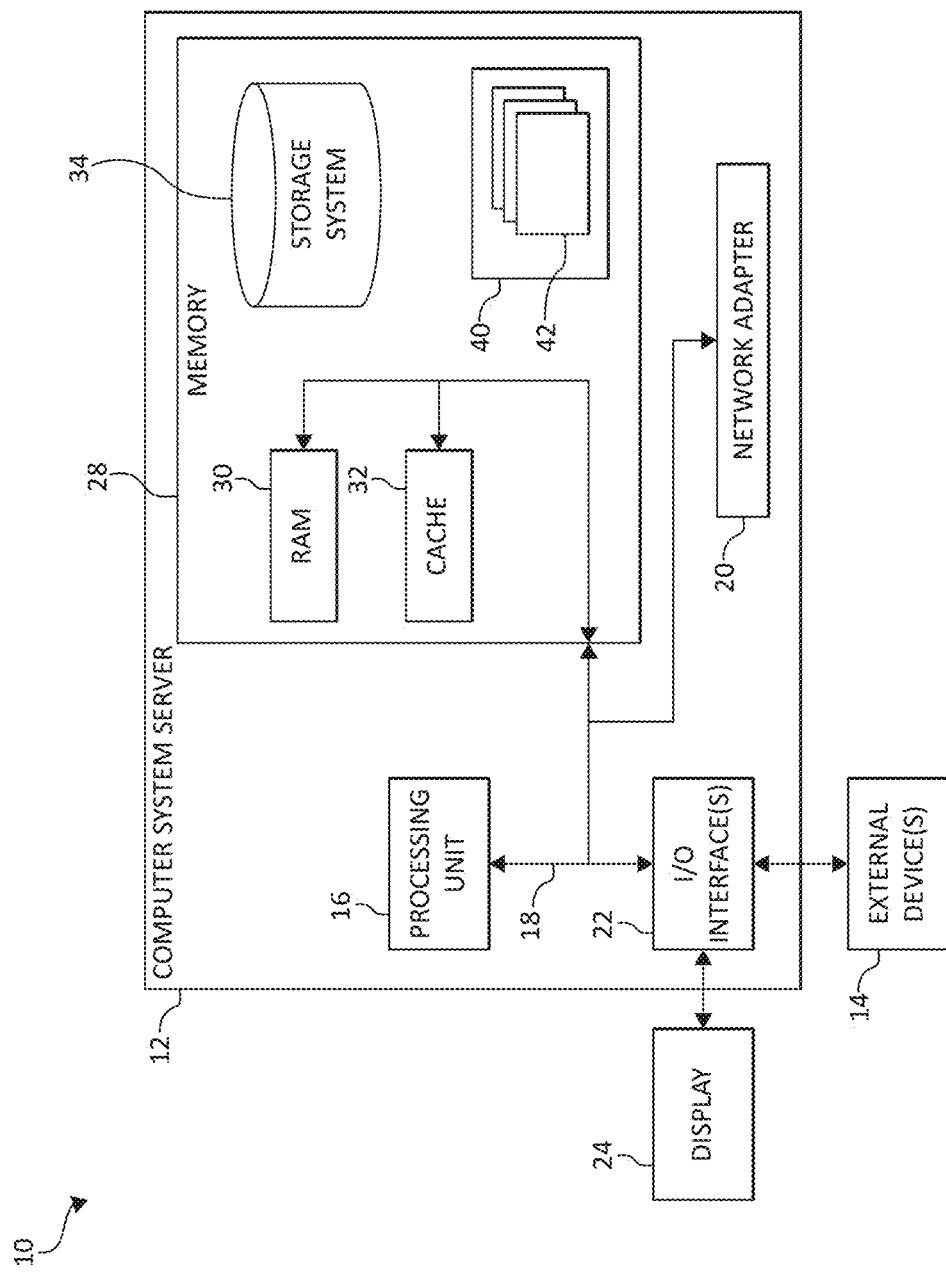
FIG. 1 is a block diagram depicting an exemplary computing node according to an embodiment of the present invention.

Hierarchical Storage Management ("HSM") is a data storage technique which automatically moves data between a primary and a secondary storage tier. HSM may also be referred to as tiered storage. In HSM systems, data files that are frequently used are stored on high-speed storage devices of the primary storage tier, such as flash drives or hard disk drive ("HDD") arrays. They are more expensive per byte stored than slower devices of the secondary storage tier, such as optical discs and magnetic tape drives. In short, HSM systems such as, for example, IBM® Spectrum Archive, execute transparent placement of frequently accessed data to fast Flash/HDD media and less frequently accessed data to tapes so as to reduce the total cost of ownership ("TCO").

In one aspect, a migration is to move data from Flash storage and/or HDD to tape device storage. A recall may be a transfer (e.g., move) of data from tape to Flash storage and/or HDD. As such, an HSM system may migrate data files from the primary disk drives to the secondary tape drives such as, for example, if they have not been used for a certain period of time, typically a few months. This data migration frees expensive disk space on the primary storage devices. If an application does reuse a file, which is on a secondary storage device, the data (e.g., file) is automatically recalled, that is, moved back to the primary disk storage. Due to this transparent file recall capability, the file remains accessible from a client application although it has been physically migrated to the secondary storage.

During a recall operation, the recall needs to locate the tape cartridge, load the tape cartridge to a tape drive, and seek the data (e.g., file) within the tape cartridge. The overhead is in minute order and is relatively slow compared to Flash storage and/or HDD. This is particularly true if there are multiple files saved in multiple tapes. The load and seek may occur many times and make the read extremely slow.

In one aspect, an HSM system such as, for example, IBM® Spectrum Protect® and IBM® Spectrum Archive®, and the HSM system may support an operational feature called optimized recall (or "selective recall"). (IBM, Spectrum Protect, and Spectrum Archive are trademarks of International Business Machines Corporation). An optimized recall accepts a read of multiple files at once and changes the file order so that the number of load/seek is minimized. Still, if the files are saved in multiple tapes, all the tapes must be loaded at least once resulting in significant overhead.

To relieve this overhead, aspects the present invention may place files that may be read together afterwards in a single tape, which may be referred to as co-location. For example, current operational protocols, without the HSM of the present invention, fail to provide co-location, and rather, scan an entire filesystem, pick up the files to be migrated, select available tapes from a specified pool, and migrate files to those available tapes from the specified pool without migrating related files to a single tape.

In one aspect, one or more applications may be enabled to co-locate data by adding new attributes/features to an HSM system (e.g., storage system). In one aspect, a new attribute, which may be herein referred to as "file group," may be added to each file in HSM systems (e.g., HSM storage systems) such as, for example, in an HSM storage system that includes tapes storage devices (e.g. IBM® Spectrum Archive®). The new attribute may be set by one or more applications per file. The HSM storage system may migrate one or more files under the same file group to the same tape storage medium. This enables applications to instruct the HSM storage system to migrate related files to the same tape and enables efficient recalls of files later.

For example, applications are enabled to determine the files that may be read together at a future period of time (examples of which may include a series of medical data of a patient or files under the same project or test for a development or simulation, astronomical research that calculates and/or archives massive amounts of data that have files that are strongly related and want to co-locate). In one aspect, a storage management operation (which may be external to HSM storage) may optimize placement of data among multiple storages (e.g., all Flash storage, disk storage, HSM storage, cloud storage, etc.) based on the file attributes, filename extensions or contents thereby enabling an application to locate related files.

In an additional aspect, the present invention adds a new feature of the HSM storage to the tape reclaim feature so that files will be stored in a storage medium (e.g., tapes) in more optimal manner from data co-location perspective, and thus the recall efficiency will be further improved. Thus, the present invention provides for data co-location in hierarchical storage management (HSM) using one or more processors. Related data units (e.g., files) may be grouped to be collectively accessed from a plurality of data units stored on a first sequential media. The related data units may be migrated from the first sequential media in the HSM system to a second sequential media in the HSM system to sequential and continuous access to the related data units on the second sequential media.

In an additional aspect, one or more data units stored on at least one first sequential medium may be migrated and/or copied to a second sequential medium. One or more related data units having a propensity (e.g., greater than a defined threshold or percentage and/or a value within a defined range of values) and/or that are likely to be subsequently and collectively accessed among a plurality of data units stored on the at least one first sequential medium may be grouped. The grouped, related data units may be migrated, copied, and/or saved on a second sequential medium in such a way that the grouped, related data units can be sequentially and continuously accessed on the second sequential medium. In one aspect, the grouping operation may be performed based on a timestamp indicating when a data unit was accessed and/or a name of a directory to which a data unit belongs. In one aspect, the saving operation may be performed data units that are more likely to be accessed among the plurality of data units in a group are saved in a section that offers fast access time on the second sequential medium. In one aspect, the section of the second sequential medium that provides fast access time (e.g., a seek time or "fast access" may be less than several minutes to access data at the end of an 18 Terabyte "TB" tape cartridge) is at a beginning of the second sequential medium.

In one aspect, the first sequential medium and second sequential medium are tapes. The data units may be files. In an additional aspect, the operations of grouping and saving may be performed as part of a reclamation process in which only related and/or valid data is copied to the second sequential medium without copying non-related and/or invalid data on the at least one first sequential medium. In one aspect, multiple sequential media may exist and multiple files in the same/similar group may exist across the multiple sequential media. It should be noted that a reclaim operation may be performed if an HSM system manages the relationship between tapes and groups and specifies the relationship between files and groups.

It should be noted, as a preliminary matter, that one or more calculations may be performed using various mathematical operations or functions that may involve one or more mathematical operations (e.g., solving differential equations or partial differential equations analytically or computationally, using addition, subtraction, division, multiplication, standard deviations, means, averages, percentages, statistical modeling using statistical distributions, by finding minimums, maximums or similar thresholds for combined variables, etc.).

Other examples of various aspects of the illustrated embodiments, and corresponding benefits, will be described further herein.

It is understood in advance that although this disclosure includes a detailed description on cloud computing, implementation of the teachings recited herein are not limited to a cloud computing environment and/or computing systems associated with one or more vehicles. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random-access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
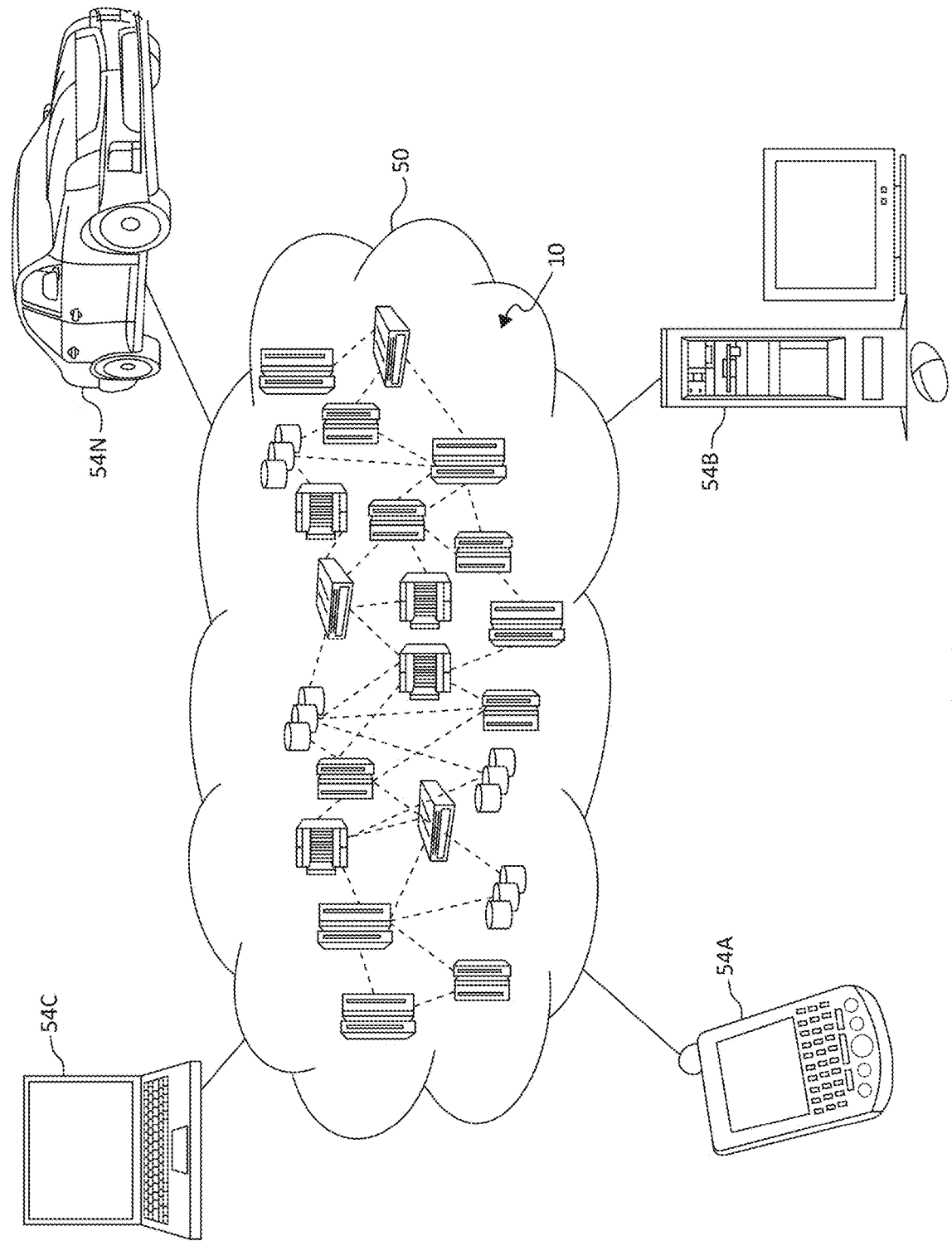
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
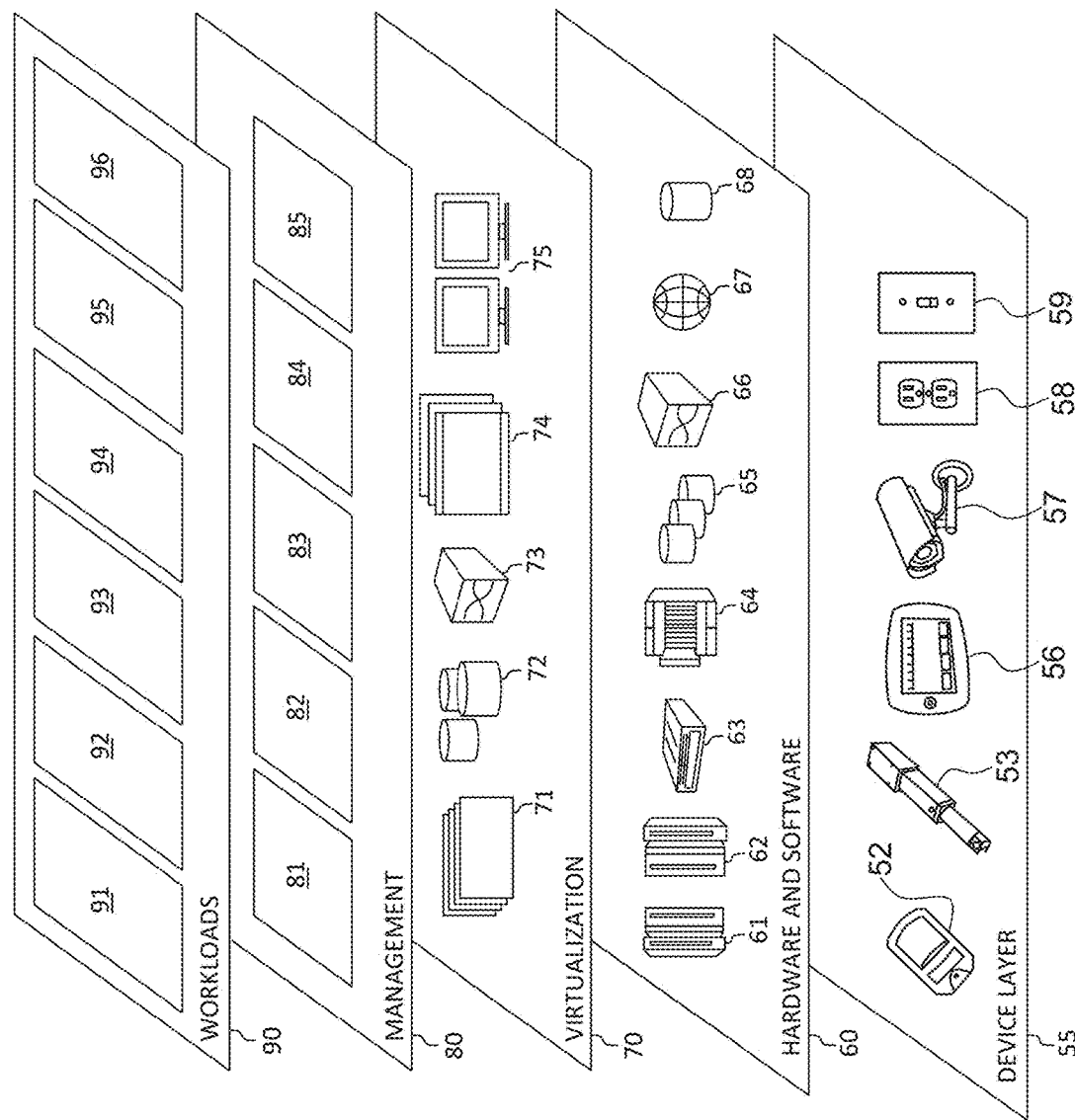
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, actuator 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote-control device), additional actuator devices, so called "smart" appliances such as a refrigerator or washer/dryer, and a wide variety of other possible interconnected objects.

Hardware and software layer 60 include hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various workloads and functions 96 for implementing data co-location in an HSM system. In addition, workloads and functions 96 for implementing data co-location in an HSM system may include such operations as data analytics, data analysis, and as will be further described, notification functionality. One of ordinary skill in the art will appreciate that the workloads and functions 96 for implementing data co-location in an HSM system may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

In one aspect, the mechanisms of the illustrated embodiments provide a novel approach for performing data co-location in an HSM system. Related data units may be grouped to be collectively accessed from a plurality of data units stored on a first sequential media. The related data units may be migrated from the first sequential media in the HSM system to a second sequential media in the HSM system to sequential and continuous access to the related data units on the second sequential media.

In an additional aspect, a migration file group may be added to an HSM system for data co-location. In one embodiment, a file group attribute may be automatically added to one or more files in the HSM system to enable one or more applications to co-locate data. The one or more files, having a similar file group attribute, may be migrated from a storage device in a first tier in the HSM system to a tape storage device in an nth tier of the HSM system to enable recalling of the one or more files in the HSM system.

Figure 4:
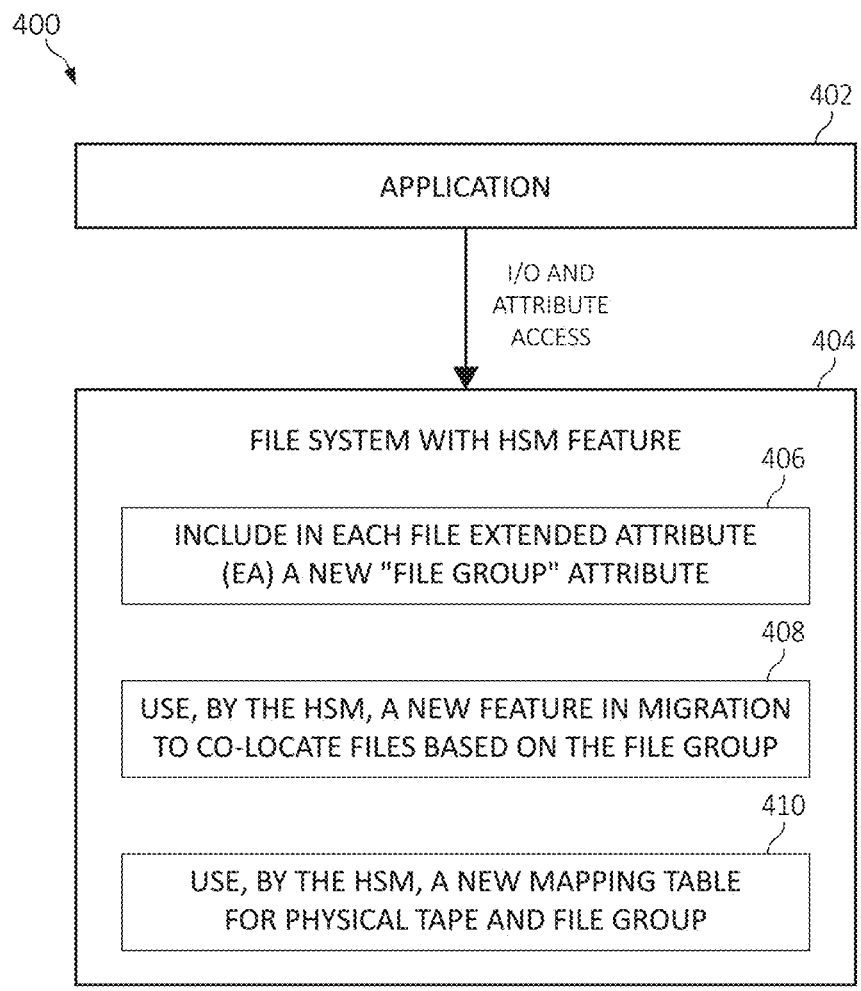
FIG. 4 is an additional block diagram depicting an HSM system for adding a migration file group according to various aspects of the present invention.

Turning now to FIG. 4, a block flow diagram of an HSM system 400 for adding a migration file group to an HSM system for data co-location is depicted. As will be seen, many of the functional blocks may also be considered "modules" of functionality, in the same descriptive sense as has been previously described in FIGS. 1-3. Many of the functional blocks 400 may execute as background processes on various components, either in distributed computing components, or on the user device, or elsewhere, and generally unaware to the user performing generalized tasks of the present invention. Also, one or more aspects of FIGS. 1-3 may also be included with and/or implemented with FIG. 4.

In one aspect, one or more applications are allowed to set a file attribute such as, for example, a new file attribute called "file group," which may be introduced to each of the files in the HSM storage, as in block 402. That is, an Input/output ("I/O") for read/write access of file data and a command or application programming interface ("API") may be provided to the file system for attribute access and may specify an attribute (e.g., file group) for each file. In an HSM storage system 404, each file extended attribute (EA) may include the new "file group" attribute, as in block 406. The HSM storage system 404 may be enabled with a new feature of operation to co-locate files (during migration) based on the new "file group" attribute, as in block 408. The HSM storage system 404 may also use a mapping table (see FIG. 5) for physical tape and file group, as in block 410.

Moreover, when a file is to be migrated, the HSM storage may refer to file groups and save the files in the same file group on the same tape storage device. The file group attribute may be required when files are to be migrated. Because of the nature of the file group attribute, the value of the attribute is not determined when a file is migrated. Rather, the value of the file group attribute may be determined when the file is created or when operations, including READ operations, by a user application are determined.

For example, consider the example implementation of the file group attribute. The file group attribute may be represented by a 64-bit value, for example. The 64-bit value may be stored in an Extended Attribute (EA) of a file. When the file is migrated and the file's stub file is created on a Flash storage and/or HDD, the EA may exist in the inode block (on the Flash/HDD) of the stub file. Accordingly, the EA can be read and changed regardless of the migrate state. A default file group value may also be available. When a new file is created, the HSM saves the default value. In one aspect, the present invention may leverage existing commands and application programming interfaces ("APIs") provided by a file system to be used to change the file group value of each file. Thus, the present invention eliminates any need to add new features needed to change the file group value by an application or add new features to refer to or check the file group from an application.

The HSM system may provide one or more selected commands for migration. For example, HSM systems such as, for example, IBM® Spectrum Archive may provide a migrate command (e.g., a linear tape file system ("ltfsee") migrate command), which specifies a list of files to be migrated and the target tape library and tape pool. A new entry, fileGroup, may be added to allow a file group to be specified for the file list and the HSM storage system may ultimately overwrite the value of EA with that value and use the value. A sample of the file list that can be specified to the migrate command may be:

```
Existing command
    /gpfs/gpfs0/archive/test1/test_file_1
New command (may be changed to XML, for example):
    <file>
        <path>/gpfs/gpfs0/archive/test1/test_file_1</path>
        <fileGroup>1</fileGroup>
    </file>
```

The HSM system may provide special or selected commands for determining whether a file is migrated. For example, in case of IBM® Spectrum Archive®, the file group value for each file can be added to the output of "ltfsee info files" command, which shows the migrate status for each file.

Turning now to FIG. 5, a mapping table 500 in a hierarchical storage management (HSM) system for data co-location is depicted. In one aspect, the mapping table 500 maps between physical tapes in a pool and file groups in the HSM storage. The mapping table 500 is automatically created/updated by the HSM when migration is performed, as will be described later. The HSM may provide a special command user interface to allow the user to configure the mapping table. For example, a physical tape identifier and a file group attribute may be included. A tape cartridge such as, for example, tape 1 may be associated with file groups 1, 2, or 3. Tape 2 may be associated with file group 4 and group 5.

In operation, by way of example only, in response to a migrate command to request migration issued from an application, the HSM storage may read the value of the file group of files to be migrated. If the value of a file group is the default value, co-location may not be performed. The files may be migrated to an available tape in a specified pool as is conventionally done. If multiple tape drives/storage devices are available, migration may be performed to the tape drives in parallel. If the value of a file group is not the default value, the mapping table may be consulted. If the file group has been registered, the tape storage device associated with the file group may be selected. If the file group has not been registered, the file group may be associated with an available tape storage device (the mapping table is updated).

If there is not available space on the tape, a new tape may be selected and may be also associated with the file group.

If multiple tape drives are available, then migration may be performed to the multiple tape drives in parallel only if there are multiple file groups to be migrated and the file groups are associated with different tapes. Parallel migration may be also performed if file groups include files with the default value.

In one aspect, each application may not be required to specify an absolute value to specify a file group. Rather, a command option of the HSM storage may be implemented and used that specifies that all the files to be migrated should be included in the same group. The HSM may create a new file group value and add the file group to the mapping table 500.

Thus, each application may be enabled to specify related files to be included in the same group before migrating the files to a tape storage device after creating the files in the HSM storage. By storing a file group value in the EA of files, the application may set a file group for each file at any time. It should be noted that reading and setting a file group does not require any new functions or features. Rather, the mechanisms of the present invention ensure that the files in the same file group will be saved on the same tape particularly for reading and setting the file group. When reading and/or recalling files at a later period of time, the requirement to load multiple tapes by the application is eliminated therefore the performance is significantly improved compared to reading and/or recalling the files that are distributed among multiple files. Optimized recall of multiple files is also effective, where the files are reordered and read so that useless seeks are minimized. That is, the optimized recall may include providing a list of multiple files to the HSM and the HSM is enabled to recall all those files in any order. The HSM may recall files in the most efficient file order so that the tape load/unload operations and the file seek within a tape operation are minimum (e.g., minimized or reduced).

If all the related files are included in a single file group, the files are always sequentially migrated and the migration performance decreases. Therefore, files that belong to a default file group may be migrated to multiple available tapes in a pool, in parallel, using all available drives. Migration, which uses co-location, may be performed only for files for which a file group is explicitly specified by an application.

The HSM system may have a collection of tape storage devices, called pools, and migration may be performed by specifying the files and a pool. In one aspect, one or more tape storage devices may be assigned to one pool. In one aspect, the present invention provides for migrating multiple, specified files to one tape storage device by assigning only one single tape to a pool.

However, the assignment of only one single tape to a pool may include the following drawbacks and may reduce computing efficiency. For example, as the number of pools increases, a migration policy may be required for each of the pools, which may yield some difficulty in creation and maintenance of the policies. In particular, in relation to co-location, related files need to be selected using directories from which files to be migrated are selected and policy rules and other policies that take into consideration the capacity of a Flash/HDD, making operation further complicated. Moreover, when an application changes the definitions of related files, the complexity of following policies increases and maintenance of the policies is difficult. Also, maintenance may be cumbersome since whenever the tape in each pool becomes full, a tape needs to be manually added. Also, pools, tapes and migration policies may be managed by IT administrators whereas files are created by end users. Only the end users know the contents of the files, how the files are referred to, and an extent the files are related to. Also, pools that include only one tape may impose a significant burden on administrators because the administrators are required to know in detail what directories are to be used and how much data to be placed in respective directories by the end users.

Accordingly, the present invention provides for one or more tape storage devices to be assigned to one pool. One or more applications may write a file group in the EA of each file at any time, the HSM manages mapping between file groups and tapes and performs migration by taking co-location into consideration, thereby achieving co-location.

In one aspect, the HSM may include a storage and a plurality of tape storage devices. A file group for a plurality of files may be set and/or assigned to be stored in the storage. The plurality of files, belonging to the file group, may be migrated from the HSM storage to one single tape storage device. A new recall operation which takes the file group as the specifier can be possible. When a recall operation, which specifies a file group, is executed, the plurality of files belonging to the file group may be recalled from one tape storage device to the HSM storage.

However, when one file in a group is read and recalled, other files in the same group may also be read ahead if related files are known. By nature of co-location, the files to group are not necessarily created at the same time or become subjects to migration at the same time. Since the HDD/Flash space is limited, files need to be migrated continuously to the tape in HSM. This means that a first file in file group 1 in the mapping table 500 may be migrated to the beginning of the tape, followed by a second file in file group 2 and a third file in file group 3, and then a file in file group 1 may be migrated to the same tape.

In other words, files in the plurality of file groups may be fragmentated on a single tape. The reclaim feature, which is unique to tape storage, may be performed as follows. A tape may be a sequential access device. When a migrated file is deleted from an HSM system by a user or a migrated file is recalled and updated by a user, the deleted or updated old file data remains on the tape as invalid data. From the user's view point, the invalid data wastes the tape capacity. A reclaim is clean-up operation that may be performed for deleting invalid data in conventional tape storage. When a reclaim operation is performed, all the valid files will be read from the original tape, starting from the beginning of the original tape, and are copied to a new tape (or read valid data may be first saved on HDD/Flash, then written back to the same tape, starting from the beginning of the tape). Thus, the new tape (e.g., a "reclaimed tape") will not have invalid data and only valid files are written from the beginning of the new tape. The original tape will be formatted after the completion of copying of all the valid files. As a result, the entire space on the tape that has been consumed by the invalid data becomes available to the user.

As such, the present invention provides for data co-location in hierarchical storage management (HSM), again by a processor, is provided. Related data units may be grouped to be collectively accessed from a plurality of data units stored on a first sequential media. The related data units may be migrated from the first sequential media in the HSM system to a second sequential media in the HSM system to sequential and continuous access to the related data units on the second sequential media.

It should be noted that currently, a reclaim operation reads only valid files from a tape, starting from the beginning of the tape, and copies the files to a new tape. The present invention adds a data relocation feature that takes co-location into consideration. Thus, the mechanism of the illustrated embodiments may also an enhance feature (e.g., a file relocation function) for data co-location to the reclaim feature of HSM storage systems including tapes like IBM Spectrum Archive. The enhanced feature enables related files to be stored in contiguous locations within a tape. The present invention allows data co-location to be performed more strictly and can improve the performance of collective reading of multiple related files by an application. The assumption is that groups of related files are set on an HSM system to which the present invention is applied and can be acquired from the HSM system. For example, as indicated herein, a group identifier may be added to the extended attribute (EA) of each file. Alternatively, a group and files included in the group may be specified on the HSM system by using a special setting file or the like.

In one aspect, it may be assumed that file grouping operations as described herein may be performed prior to, in conjunction with, and/or subsequent to the data unit grouping and the HSM storage has the following tape-file-group mapping tables 500 of FIG. 5, 600 of FIG. 6, and/or tape-file-group mapping table 700 of FIG. 7. Repetitive description of like mappings, elements, components, modules, services, applications, and/or functions employed in other embodiments described herein (e.g., mapping tables of FIGS. 5-7) is omitted for sake of brevity.

Further, it may be assumed that a file group may be stored in the EA of each file and can be referred to and set by an application, and the value of EA can be referred to by the HSM storage as well. For example, assume that the following files may be stored on tapes 1 and 2 as illustrated in FIG. 6. That is, G1_file 1, G2_file 1, G3_file 1, G1_file 2, and/or invalid file may be stored on tape 1 and G4_file 1, G5_file 1, invalid file, G4_file 4 may be stored on tape 2, where "G" added to the beginning of each file name in the table indicates a file group.

For example, in each of the tapes (e.g., tapes 1 and 2 of FIG. 6), there are invalid data, and the files in the same group are not co-located (e.g., the files are discretely distributed on a tape). A reclaim with the new feature of the present invention is executed for each of these files. Only valid files are copied using a conventional reclaim technique in such a way that the files on the tape are arranged in the following order. First, the files in the same file group are co-located (e.g., the files are stored in contiguous locations on the tape). Second, the files in a file group are files that can be accessed at the same time. In addition, files that can be accessed at the same time in a file group may be co-located based on access time (e.g., "atime" which may be a timestamp indicating the time a file was read), directory name, or the like. Third, the order of file groups on a tape may be determined based on the access time ("atimes") of the files in each file group and a file group that is most likely to be accessed may be located at the beginning of the tape. The "atime" is a timestamp when a read is performed on a file. If atime is newer/more recent, the file has been accessed recently. If the atime is older (e.g., time greater than a defined age threshold), the file has not been accessed for long time. In this case, the average atime of files in a file group may be calculated or the newest atime may be analyzed and determine the file group that may be accessed. In other words, the atime may be used as a "best guess" or "estimative" as to which file groups are likely (e.g., having a selected or defined probability or percentage) to be accessed. Consider now the following implementation operations as described herein using the mapping tables 600 and 700 of FIGS. 6-7.

In a first step, an index of a tape to be reclaimed may be analyzed/checked and one or more file groups of valid files stored on the tape may be acquired. A tape-file-group mapping table (e.g., the mapping tables 600 and 700) may be used to refer to and one or more file groups of the tape to be reclaimed may be acquired.

In a second step, for a reclaim requirement, a space on an HDD/Flash may be reserved as a temporary area that is capable of holding data from one tape. The tape may be read to be reclaimed, starting from the beginning of the tape, and temporarily copy all of the valid migrated files to the temporary area on the HDD/Flash. For example, G1_file1, G2_file1, G3_file1, G1_file2, G7_file1 and G7_file2 may be copied from Tape 1.

In a third step, a "copy-to tape" operation may be mounted and the files in each file group may be copied from a temporary area on the HDD/Flash to contiguous locations on the tape (e.g., Tape 1). The files may be deleted from the temporary area on the HDD/Flash after completion of the copying. For example, G1_file1, G1_file2, G2_file1, G3_file1 G7_file1 and G7_file2 may be copied from Tape 1 of FIG. 6.

In an additional aspect in association with step 3, the following optimizations may be performed and/or added. In one aspect, the G1 files may be sorted based on access time or parent directory name. By co-locating files that are likely to be read at the same time among the files in the same file group, the seek time on the tape can be reduced.

The order of file groups may also be optimized in association with step 3. For example, the order of file groups may be determined by focusing attention on the average of access times of the files in each file group or the newest (e.g., most recent) access time. By placing file groups that are more likely (e.g., above a threshold value, percentage, or value within a range of values) to be accessed in locations as near as possible to the beginning of the tape, the seek time is reduced.

Turning now to FIG. 7, steps 2 and 3 described above may be performed for all of the tapes to be reclaimed. In this example described in FIG. 7, steps 2 and 3 may be performed for Tape 1 and Tape 2. After completion of the reclaim operation process, data relocation on the tape is also completed. In this example, the following state will result as illustrated in FIG. 7. In this way, the file relocation that takes into consideration co-location can be achieved, in addition to deletion of invalid data. That is, for example, all G1, G2, G3, and G7 group files are on tape 1 while all group G4 and G5 files will be stored on tape 2. By performing more strict optimum location using the present invention, requests to read related files can be processed more efficiently.

Figure 8:
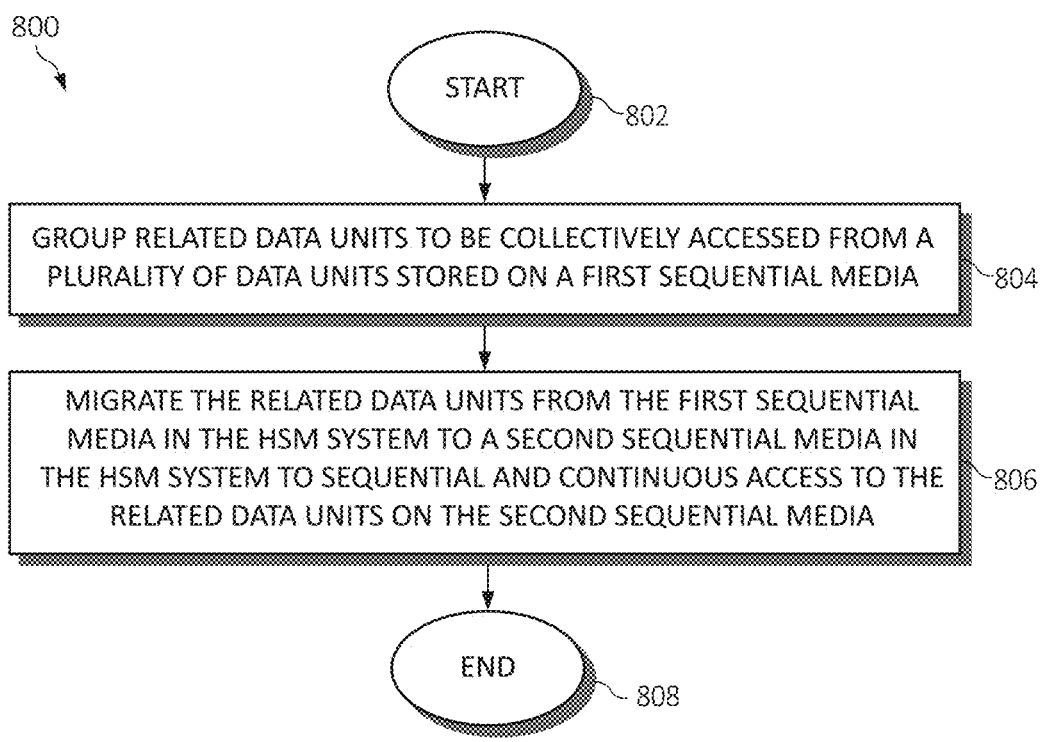
FIG. 8 is an additional flowchart diagram depicting an additional exemplary method for implementing data co-location in hierarchical storage management (HSM) by a processor, again in which aspects of the present invention may be realized.

Turning now to FIG. 8, a method 800 for performing data co-location in hierarchical storage management (HSM) may be implemented. The functionality 800 may be implemented as a method executed as instructions on a machine, where the instructions are included on at least one computer readable medium or one non-transitory machine-readable storage medium. In one aspect, the functionality, operations, and/or architectural designs of FIGS. 1-7 may be implemented all and/or in part in FIG. 8.

The functionality 800 may start in block 802. Related data units may be grouped to be collectively accessed from a plurality of data units stored on a first sequential media, as in block 804. The related data units may be migrated from the first sequential media in the HSM system to a second sequential media in the HSM system to sequential and continuous access to the related data units on the second sequential media, as in block 806. The functionality 800 may end, as in block 808.

In one aspect, in conjunction with and/or as part of at least one block of FIG. 8, the operations of method 800 may include each of the following. The operations of method 800 may initiate the grouping and the migrating during a reclamation process where only the related data units are saved to the second sequential media. The related data units may be grouped according to a timestamp indicating access of a data unit or a name of directory of the data unit. A reclaim operation may be performed on the related data units such that the related data units in the second sequential media according to defined order.

The operations of method 800 may migrate the related data units in a section of the second sequential media providing the sequential and continuous access to the related data units. The operations of method 800 may migrate the related data units in a beginning section of the second sequential media providing the sequential and continuous access to the related data units. The operations of method 800 may map the related data units, having a similar file group attribute, to the similar second sequential media, and/or save the related data units, having the similar file group attribute, to the second sequential media.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for implementing data co-location in hierarchical storage management (HSM) system by a processor, comprising:
    automatically grouping related data units from a plurality of data units stored on a first sequential media, wherein a file group attribute is added to each of the plurality of data units by one or more applications upon creation of each of the plurality of data units by the one or more applications, and wherein grouping the related data units includes grouping those of the plurality of data units having a similar file group attribute; and
    migrating the related data units from the first sequential media in the HSM system to a second sequential media in the HSM system to enable sequential and continuous access to the related data units on the second sequential media, wherein responsive to receiving a migration command having an entry specifying the similar file group attribute and a list of the plurality of data units comprising the related data units identified for the migration, the HSM system overwrites any existing value within an extended attribute (EA) of the plurality of data units on the list with the similar file group attribute and co-locates the related data units upon migration to the second sequential media.

2. The method of claim 1, further including performing the grouping and the migrating during a reclaim operation where only the related data units are saved to the second sequential media.

3. The method of claim 1, further including grouping the related data units according to name of directory of the data unit.

4. The method of claim 1, further including grouping the related data units according to a timestamp indicating a time of access of a data unit.

5. The method of claim 1, further including performing a reclaim operation on the related data units such that the related data units in the second sequential media are arranged according to defined order.

6. The method of claim 1, further including:
    migrating the related data units in a beginning section of the second sequential media; or
    migrating the related data units having the similar file group attribute in the beginning section of the second sequential media.

7. The method of claim 1, further including:
    mapping the related data units, having the similar file group attribute, to a similar second sequential media; and
    saving the related data units, having the similar file group attribute, to the second sequential media.

8. A system for data co-location in hierarchical storage management (HSM) system, comprising:
    one or more computers with executable instructions that when executed cause the system to:
        automatically group related data units from a plurality of data units stored on a first sequential media, wherein a file group attribute is added to each of the plurality of data units by one or more applications upon creation of each of the plurality of data units by the one or more applications, and wherein grouping the related data units includes grouping those of the plurality of data units having a similar file group attribute; and
        migrate the related data units from the first sequential media in the HSM system to a second sequential media in the HSM system to enable sequential and continuous access to the related data units on the second sequential media, wherein responsive to receiving a migration command having an entry specifying the similar file group attribute, and a list of the plurality of data units comprising the related data units identified for the migration, the HSM system overwrites any existing value within an extended attribute (EA) of the plurality of data units on the list with the similar file group attribute and co-locates the related data units upon migration to the second sequential media.

9. The system of claim 8, wherein the executable instructions further perform the grouping and the migrating during a reclaim operation where only the related data units are saved to the second sequential media.

10. The system of claim 8, wherein the executable instructions further group the related data units according to name of directory of the data unit.

11. The system of claim 8, wherein the executable instructions further group the related data units according to a timestamp indicating a time of access of a data unit.

12. The system of claim 8, wherein the executable instructions further perform a reclaim operation on the related data units such that the related data units in the second sequential media are arranged according to defined order.

13. The system of claim 8, wherein the executable instructions further:
    migrate the related data units in a beginning section of the second sequential media; or
    migrate the related data units having the similar file group attribute in the beginning section of the second sequential media.

14. The system of claim 8, wherein the executable instructions further:
    map the related data units, having the similar file group attribute, to a similar second sequential media; and
    save the related data units, having the similar file group attribute, to the second sequential media.

15. A computer program product for, by a processor, implementing data co-location in hierarchical storage management (HSM) system, the computer program product comprising a non-transitory computer-readable storage medium having computer-readable program code portions stored therein, the computer-readable program code portions comprising:

an executable portion that automatically groups related data units from a plurality of data units stored on a first sequential media, wherein a file group attribute is added to each of the plurality of data units by one or more applications upon creation of each of the plurality of data units by the one or more applications, and wherein grouping the related data units includes grouping those of the plurality of data units having a similar file group attribute; and an executable portion that migrates the related data units from the first sequential media in the HSM system to a second sequential media in the HSM system to enable sequential and continuous access to the related data units on the second sequential media, wherein responsive to receiving a migration command having an entry specifying the similar file group attribute and a list of the plurality of data units comprising the related data units identified for the migration, the HSM system overwrites any existing value within an extended attribute (EA) of the plurality of data units on the list with the similar file group attribute and co-locates the related data units upon migration to the second sequential media.

16. The computer program product of claim 15, further including an executable portion that performs the grouping and the migrating during a reclaim operation where only the related data units are saved to the second sequential media.

17. The computer program product of claim 15, further including an executable portion that:
groups the related data units according to name of directory of a data unit; or
groups the related data units according to a timestamp indicating a time of access of a data unit.

18. The computer program product of claim 15, further including an executable portion that perform a reclaim operation on the related data units such that the related data units in the second sequential media are arranged according to defined order.

19. The computer program product of claim 15, further including an executable portion that:
migrates the related data units in a beginning section of the second sequential media; or
migrates the related data units having the similar file group attribute in the beginning section of the second sequential media.

20. The computer program product of claim 15, further including an executable portion that:
maps the related data units, having the similar file group attribute, to a similar second sequential media; and
saves the related data units, having the similar file group attribute, to the second sequential media.

* * * * *